United States Patent
Boettcher et al.

(10) Patent No.: US 10,305,265 B2
(45) Date of Patent: May 28, 2019

(54) SENSOR SYSTEM FOR SWITCHGEAR ASSEMBLIES

(71) Applicant: WIKA Alexander Wiegand SE & Co. KG, Klingenberg (DE)

(72) Inventors: Arthur Boettcher, Sulzbach (DE); Markus Diener, Elsenfeld (DE); Thomas Heckler, Grossheubach (DE); Alexander Hein, Grosswallstadt (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 134 days.

(21) Appl. No.: 15/631,493

(22) Filed: Jun. 23, 2017

(65) Prior Publication Data
US 2017/0373475 A1 Dec. 28, 2017

(30) Foreign Application Priority Data

Jun. 23, 2016 (DE) .................... 10 2016 007 635

(51) Int. Cl.
| | |
|---|---|
| *H01H 9/00* | (2006.01) |
| *H01H 33/26* | (2006.01) |
| *H02B 13/00* | (2006.01) |
| *H02B 13/035* | (2006.01) |
| *H02B 13/065* | (2006.01) |
| *G01L 19/00* | (2006.01) |
| *H01H 33/56* | (2006.01) |

(52) U.S. Cl.
CPC ........ *H02B 13/005* (2013.01); *G01L 19/0092* (2013.01); *H01H 33/26* (2013.01); *H01H 33/563* (2013.01); *H02B 13/065* (2013.01); *H01H 9/00* (2013.01); *H02B 13/0655* (2013.01)

(58) Field of Classification Search
CPC .......... H01H 9/00; H01H 33/26; H01H 33/56; H01H 33/563; G01L 19/00; G01L 19/0092; H02B 13/00; H02B 13/005; H02B 13/035; H02B 13/065; H02B 13/0655
See application file for complete search history.

(56) References Cited

U.S. PATENT DOCUMENTS

| | | | | |
|---|---|---|---|---|
| 4,369,364 A | * | 1/1983 | Kuntermann | H02H 1/0023 250/227.11 |
| 2007/0014060 A1 | * | 1/2007 | Land, III | H02H 1/0023 361/42 |
| 2011/0036175 A1 | * | 2/2011 | Land, III | H01H 33/26 73/723 |

FOREIGN PATENT DOCUMENTS

| | | | |
|---|---|---|---|
| DE | 3428322 A1 | 2/1986 | |
| FR | 2926370 A1 * | 7/2009 | ........... H02B 13/065 |

* cited by examiner

*Primary Examiner* — Nguyen Q. Ha
(74) *Attorney, Agent, or Firm* — Muncy, Geissler, Olds & Lowe, P.C.

(57) ABSTRACT

A sensor system for determining physical variables of a switchgear assembly having a sensor connection, which is designed for connection to the switchgear assembly, within which a humidity sensor and/or a pressure sensor and a light sensor for detecting light flashes are arranged. A switchgear assembly is provided that is filled, in particular, with a protective gas, comprising at least one such sensor system.

16 Claims, 2 Drawing Sheets

SENSOR SYSTEM FOR SWITCHGEAR ASSEMBLIES

This nonprovisional application claims priority under 35 U.S.C. § 119(a) to German Patent Application No. 10 2016 007 635.6, which was filed in Germany on Jun. 23, 2016, and which is herein incorporated by reference.

BACKGROUND OF THE INVENTION

Field of the Invention

The invention relates to a sensor system for determining physical variables of a switchgear assembly. The invention also relates to a switchgear assembly.

Description of the Background Art

Generally known from the prior art are switchgear assemblies and sensor systems for determining the physical variables of such switchgear.

DE 34 28 322 A1 discloses a method for monitoring an insulating gas of gas-insulated high-voltage switchgear, in particular, SF6-insulated switchgear. The state variables of the insulating gas which characterize the insulating properties are detected by sensors and the signals generated are electronically further processed and analyzed. Pressure, temperature and density are determined as state variables.

SUMMARY OF THE INVENTION

It is therefore an object of the invention to provide a sensor system for determining the physical variables of a switchgear assembly which is improved compared to the state of the art, and an improved switchgear assembly.

The sensor system according to an exemplary embodiment of the invention for determining physical variables of a switchgear assembly comprises a sensor connection, designed for connection to the switchgear assembly, within which a humidity sensor and/or a pressure sensor and light sensor for detecting light flashes are arranged.

The sensor system provides highly integrated, cost-effective monitoring of switchgear, whereby humidity, pressure and density can be monitored. At the same time, it is possible to detect light flashes. This makes it possible to have only one connection for detecting the humidity, the pressure, the density and the light flashes, and only one analysis at the switchgear.

The detection of the light flashes makes it possible to detect switching arcs in the switchgear, which can occur under unfavorable or non-optimal conditions. Such unfavorable conditions are present, for example, if the humidity in a protective gas of the switchgear is too high. The frequency of occurrence of the light flashes or their intensity is indicative of the functional capability and the maintenance state of the switchgear, so that when a predetermined frequency of the occurrence of the light flashes is exceeded, a warning can be issued that the switchgear should be serviced.

In an embodiment, the sensor system can be designed to determine the humidity, the pressure, the density and/or the light flashes in switchgear filled with a protective gas, for example, sulfur hexafluoride (SF6 for short). Because only one connection is required for detecting the humidity, pressure, density and light flashes, and only one analysis at the switchgear is necessary, fluidic sealing of the switchgear is facilitated and the risk of the protective gas escaping is reduced.

Compared to the prior art, this integration of a complete diagnostic sensor system for determining humidity, pressure, density and light flashes for system monitoring in a device enables to be carried out directly on site at the process. With respect to the EMC properties and with regard to a wiring effort in the system, this results in significant advantages. In particular, vulnerability of electrical plug-in connections and cabling is also compensated for and/or minimized. Failures and errors caused by faulty electrical sensor connections are minimized by the integration into a device. A number of sealing points are also minimized to a common process connection.

In an embodiment, the sensor system at least comprises a cover which protects the sensors arranged in the sensor connection from mechanical damage. The cover is designed, for example, as a perforated plate or hole cover, which is provided with passage openings. This ensures that there is a fluidic connection between the sensors arranged in the sensor connection and the switchgear for determining the humidity, the pressure and the density.

After manufacture, the sensor connection is preferably subjected to a conditioning and is subsequently closed with a temporary cap until installation. The conditioning is preferably a gas mixture, which is introduced into the connection.

A further development of the sensor system provides that the humidity sensor is upstream of the pressure sensor. This means that the measuring point at which the humidity measurement of the protective gas takes place is located in the sensor connection in front of the measuring point of the pressure measurement. This ensures that the measured humidity of the protective gas can be assigned to the measured pressure. Due to the sequence and arrangement, this has a direct effect on the signal cabling, a distance from the sensor to the board, and therefore an optimization of the signal transmission in respect of quality and time.

It is also possible for the light sensor to be positioned upstream of the humidity sensor and the pressure sensor. As a result, the flashes of light can be detected very close to the switchgear and thus, reliably and precisely.

An embodiment of the sensor system provides that a temperature sensor can be integrated into the humidity sensor or the humidity sensor can be coupled to a temperature sensor. This makes it possible in a simple manner to compensate for the humidity signal with the detected temperature. In this case, it is possible for the temperature sensor to be arranged upstream of the humidity sensor. This means that the measuring point at which the temperature measurement of the protective gas takes place lies directly in front of the measuring point of the humidity measurement of the protective gas. This makes it possible to ensure that the measured temperature of the protective gas corresponds to or can be assigned to the measured humidity of the protective gas.

An embodiment of the sensor system provides that a further temperature sensor can be integrated into the pressure sensor or the pressure sensor can be coupled to a temperature sensor. As a result, compensation of the pressure signal with the detected temperature from a detected pressure and the temperature makes it possible to determine a density in a simple manner. In this case, it is possible for the temperature sensor to be arranged upstream of the pressure sensor. This means that the measuring point at which the temperature measurement of the protective gas takes place lies directly in front of the measuring point of the pressure measurement of the protective gas. It can thereby be ensured that the measured temperature of the protective gas corresponds to or can be assigned to the measured pressure of the protective gas.

In an embodiment of the sensor system, the humidity sensor can have passage openings which enable a pressure or process pressure to be fed to the pressure sensor within the switchgear assembly for reliable and simple pressure detection.

For example, electrical contacts transmit electrical signals from the humidity sensor to a humidity sensor board, the electrical contacts being fused into glass and arranged within the sensor connection. In this way, a fluid-tight design of the sensor system is realized in a simple manner, and the electrical contacts are electrically insulated from their surroundings. This in turn results in a reliable transmission of the electrical signals.

In an embodiment of the sensor system, the evaluation board can determine a temperature-compensated humidity signal by means of a temperature detected by the associated temperature sensor, and transmits this via an interface as a digital data signal to a superordinate measuring station or display, thereby enabling an optical output of the temperature-compensated humidity signal.

An embodiment of the sensor system provides for an evaluation board of the pressure sensor can determine a temperature-compensated pressure signal by means of a temperature detected by the associated temperature sensor, and to transmit the temperature-compensated pressure signal via an interface as a digital data signal to a superordinate measuring station or a display, thereby enabling an optical output of the temperature-compensated pressure signal.

Furthermore, it is possible that a sealing signal determined based on the temperature and the pressure signal can be transmitted via an interface as a digital data signal to a superordinate measuring station or a display, thereby enabling an optical output of the sealing signal.

In an embodiment of the sensor system, at least one threshold value is stored for the temperature-compensated humidity signal, wherein at least one signal generating unit is provided which emits an additional signal upon reaching or exceeding the at least one threshold value. As a result, a warning can be output in a simple manner when the threshold value is reached or exceeded.

In an embodiment of the sensor system, the light sensor can be coupled to at least one light guide for transmitting the light flashes from a point of origin to the light sensor. As a result, the light sensor itself can be arranged at a location which is remote from the point of origin of the light flashes, for example, a protected position within the sensor connection. Furthermore, due to the use of the optical waveguide, the position of the light sensor can be selected variably and at least almost freely within the sensor connection. Thus, said sensor is easily adaptable to different uses.

The light guide can extend beyond the sensor connection into the switchgear. As a result, the light flashes themselves can be detected in the switchgear and therefore, particularly reliably and accurately.

In order to further improve detection, in an embodiment, an optical lens can be arranged on a front end of the light guide facing the switchgear assembly, which bundles the light present within the switchgear assembly and supplies it via the light guide to the light sensor.

In an embodiment of the sensor system, the light guide comprises, on a side facing the process, a coupling device for adapting an external light source for performing a functional test. By means of this functional test, functional capability of the sensor system can be easily checked.

In order to readjust the sensitivity of the light sensor if necessary, an embodiment of the sensor system provides that this comprises an integrated self-testing device for one-off or cyclical device diagnostics, wherein the self-testing device couples light into the light guide by means of an integrated light source and tests the operation of the light sensor by means of the coupled-in light.

In an embodiment of the sensor system, it is provided that the light guide can be guided by means of a glass feedthrough through a connection area to the sensor connection. In this way, a fluid-tight design of the sensor system is realized in a simple manner.

In such a fluid-tight design, the sensor connection is tightly sealed with an adapter, a closure piece or a coupling piece. This makes it possible to open the sensor system, for example, to service or replace the sensors.

For example, the coupling piece has a free connection diameter of 15 mm to 25 mm, in particular at least 20 mm. Such a diameter has proved to be particularly suitable for acquiring the measured values. When this diameter is increased, or decreased, the cost-benefit ratio is diminished and the structural complexity of the sensor system is increased.

Furthermore, in an embodiment, an interior space surrounded by the coupling piece is evacuated or filled with a protective gas in order to achieve an electrically insulating and arc-extinguishing effect within the coupling piece.

The switchgear assembly according to the invention is filled, in particular, with a protective gas and at least comprises a previously described sensor system.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
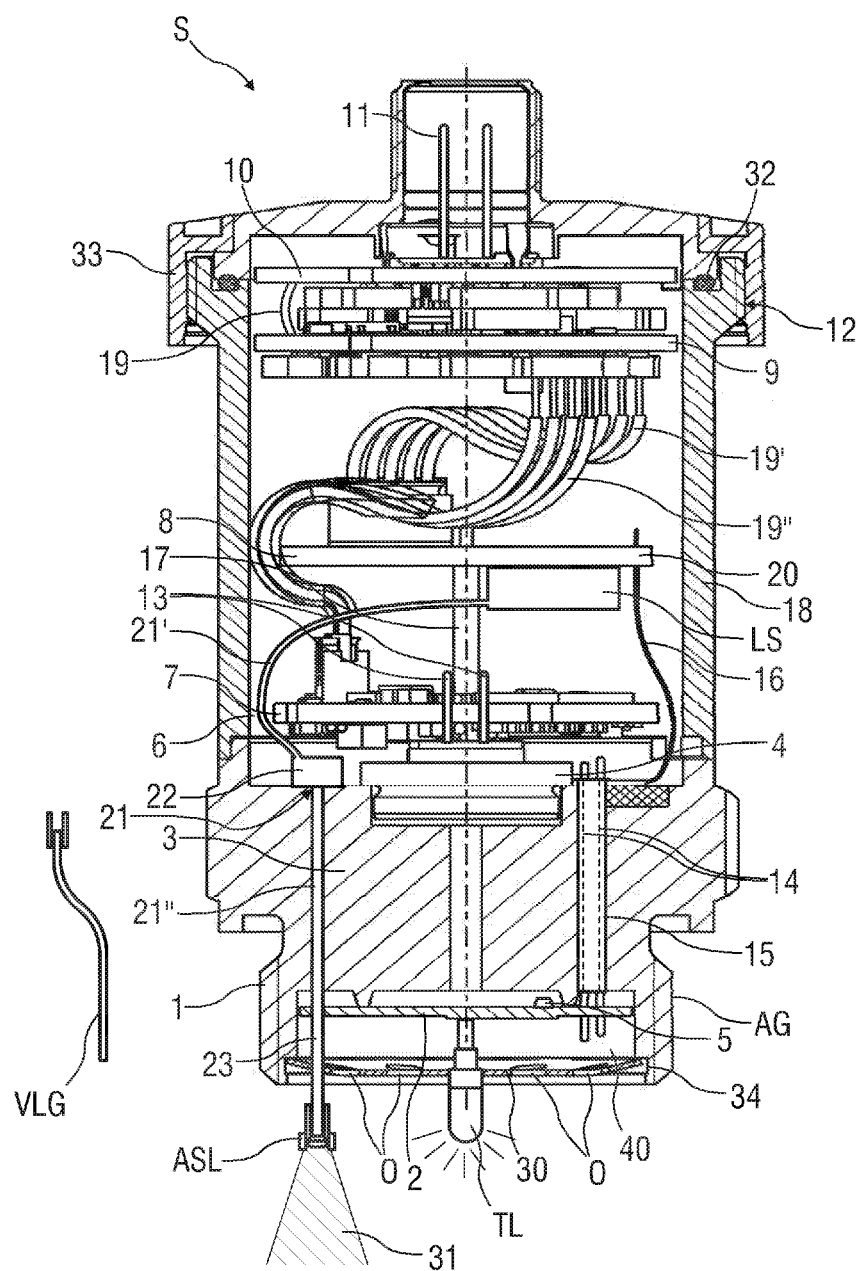
FIG. 1 is a schematic sectional view of a sensor system for a switchgear assembly.

FIG. 1 shows an exemplary embodiment of a sensor system S according to the invention for determining physical variables of a switchgear assembly. The switchgear is filled, in particular, with a protective gas, for example, with sulfur hexafluoride (SF6 for short).

The sensor system S comprises a sensor connector 1, which is designed for connection to the switchgear assembly, i.e., a sensor connector 1 directed towards the process that is to be monitored. Furthermore, the sensor system S comprises a sleeve-shaped housing 18, which is formed, for example, from a stainless-steel tube.

Within the sensor connection 1, a humidity sensor 2 is arranged towards the process, that is, towards the switchgear assembly which is directed and stored towards the front. The sensor connection 1 comprises, in a cover 30, passage openings O, which feed a process pressure within the switchgear assembly to a pressure sensor 4 arranged behind the humidity sensor 2, so that said pressure sensor is connected to the process. For this purpose, the pressure sensor 4 is fastened, for example welded, to a step 3, which is formed in the sensor connection 1 at a spacing to the humidity sensor 2.

The cover 30 is designed as a so-called perforated plate and is arranged in the sensor connection 1 to protect the sensors from mechanical damage. The cover is mounted in a circumferential annular gap 34 and is prestressed or pressed. For this purpose, the cover 30 is provided with a radius in the mounted position. The cover 30 is, for example, made of stainless steel, the passage openings O additionally enabling a simple disassembly with a hook-shaped tool.

A temperature sensor 5 is integrated into the humidity sensor 2, or the temperature sensor 5 is coupled to the humidity sensor 2. In the present exemplary embodiment, the temperature sensor 5 is arranged directly on the humidity sensor 2.

A temperature sensor 6 is also integrated into the pressure sensor 4, or the temperature sensor 6 is coupled to the pressure sensor 4, the temperature sensor 6 in the present exemplary embodiment being coupled to the pressure sensor 4 via a thermal bridge designed, for example, as a silicone cushion.

Because both the humidity sensor 2 and the pressure sensor 4 have directly coupled temperature sensors 5, 6, the respective sensor signal can be adapted to the actual sensor temperature. That is, a temperature-compensated humidity signal and a temperature-compensated pressure signal can be generated.

Directly behind the pressure sensor 4, an evaluation board 7 assigned thereto is arranged for evaluating the data acquired by the pressure sensor 4 and the temperature sensor 6 and for determining the process pressure and the associated temperature from this data. To this end, the evaluation board 7 analyzes both the pressure data transmitted from the pressure sensor 4 via connections 13 and the temperature data transmitted by the temperature sensor 6. Due to the direct localized positioning of the evaluation board 7 on the pressure sensor 4, conductor paths from the pressure sensor 4 via the connections 13 to the evaluation board 7 are designed very short and thus low-loss. It is thus possible for the pressure sensor 4, together with the evaluation board 7, to provide a very precise, temperature-compensated pressure signal.

The evaluation board 7 also comprises a zero-point stabilization and correction data for the pressure sensor 4, which have in particular been stored on the evaluation board 7 to compensate when adjusting during manufacture of the pressure sensor 4.

An evaluation board 8 for analyzing data acquired by the humidity sensor 2 is arranged downstream of the evaluation board 7.

The evaluation board 8 is connected via a mechanically flexible conductor foil 16 to connections 14, in particular, so-called connection pins, which receives data from the humidity sensor 2 in a sealed manner through a glass feedthrough 15 in the front region of the sensor connection 1.

Within the sensor system, the data of the humidity sensor 2 and the data of the associated temperature sensor 5 are passed on to the evaluation board 8 via the conductor foil 16 in order to determine a temperature-compensated humidity signal.

Furthermore, a light flash evaluation unit which comprises a light sensor 20, which is preferably formed from a photodetector, is arranged on the evaluation board 8. Said sensor is connected to the sensor connection 1 by a light guide 21, wherein in an exemplary embodiment, at least one front end 21" of the light guide 21 is guided through a glass passage to the sensor connection 1.

In the exemplary embodiment shown, the light guide 21 is designed in two parts with a front end 21" and a rear end 21', the front end 21" and the rear end 21' being coupled to each other by means of a coupling point 22.

The front end 21" of the light guide 21 is supported by the humidity sensor 2 or other structure.

In order to feed the front end 21" of the light guide 21 through the cover 30, the latter has a recess in a region 23 so that light flashes can be detected and analyzed at an angle of incidence 31.

In this case, the front end 21" of the light guide 21 can project into the switchgear via the sensor connection 1. In order to further improve detection, in an embodiment, an optical lens is arranged in the front end 21" of the light guide 21 which bundles the light present within the switchgear assembly and supplies the light to the light sensor via the light guide.

In particular, it is monitored whether a light flash occurs simultaneously with a shock or a pressure spike signal. The intensity of a light flash and its duration can also be analyzed.

The two evaluation boards 7, 8 are fastened by means of stud bolts 17 to the sensor connection 1 which is directed towards the process. Both evaluation boards 7, 8 then transmit their signal data to a superordinate bus board 9. In particular, so-called stranded plug connectors 19, 19', 19" are used for this transmission.

The bus board 9 provides, optionally or in parallel, the data pressure, humidity, temperature or the density derived therefrom of the process applied at the sensor connection 1.

The sensor data is provided either analogously or digitally or in a customer-specific bus protocol. For this purpose, the data is guided to a display or a measuring station via an outwardly directed, sealed connection system 11, which preferably comprises a plurality of so-called connector pins. For this purpose, a further connection board 10 which is mounted between the bus board 9 and the connection system 11, is used, on which are integrated for the manufacture of an electromagnetic compatibility (EMC) and improve transmission behavior with regard to susceptibility to interference.

The connection system 11, that is, the connector pins, are guided out of a housing cap 12 to the outside, in particular, by pressing or injection molding.

For maintenance purposes, the housing cap 12 with the connection system 11 can be removed from the housing 18 and sealed again by means of an O-ring-shaped seal 32 and a screw cap 33.

Optionally, the connection system 11 is designed in the form of an optical waveguide, which allows an optical transmission of the sensor information and measurement values to a control room.

Furthermore, the light guide 21 can end up both within the sensor connection 1 protected from the cover or, as shown, can protrude from the sensor connection 1. Optionally, an attachment lens can be inserted at the front end 21" of the light guide 21.

Optionally, an extension VLG may be attached to the light guide 21 to extend the light sensor 20 into an adapter or a port.

To test the light sensor 20, a test lamp TL can also be provided within the connector or within the device on a Y-light guide so that a response of the light sensor system, that is, the light sensor 20, can be checked on demand or at regular predetermined or programmed intervals. In this way, a possible soiling of the attachment lens ASL or of the light guide 21 can also be detected. A function of the coupling point 22 or the light evaluation LS can also be checked, in particular also an optocoupler which converts light signals into electrical signals for evaluation within the light evaluation LS.

In an embodiment of the invention, the sensor system S is closed by a cap or has other protective devices which prevent or minimize a preloading of the sensors before the sensor system S is mounted on the switchgear assembly.

Figure 2:
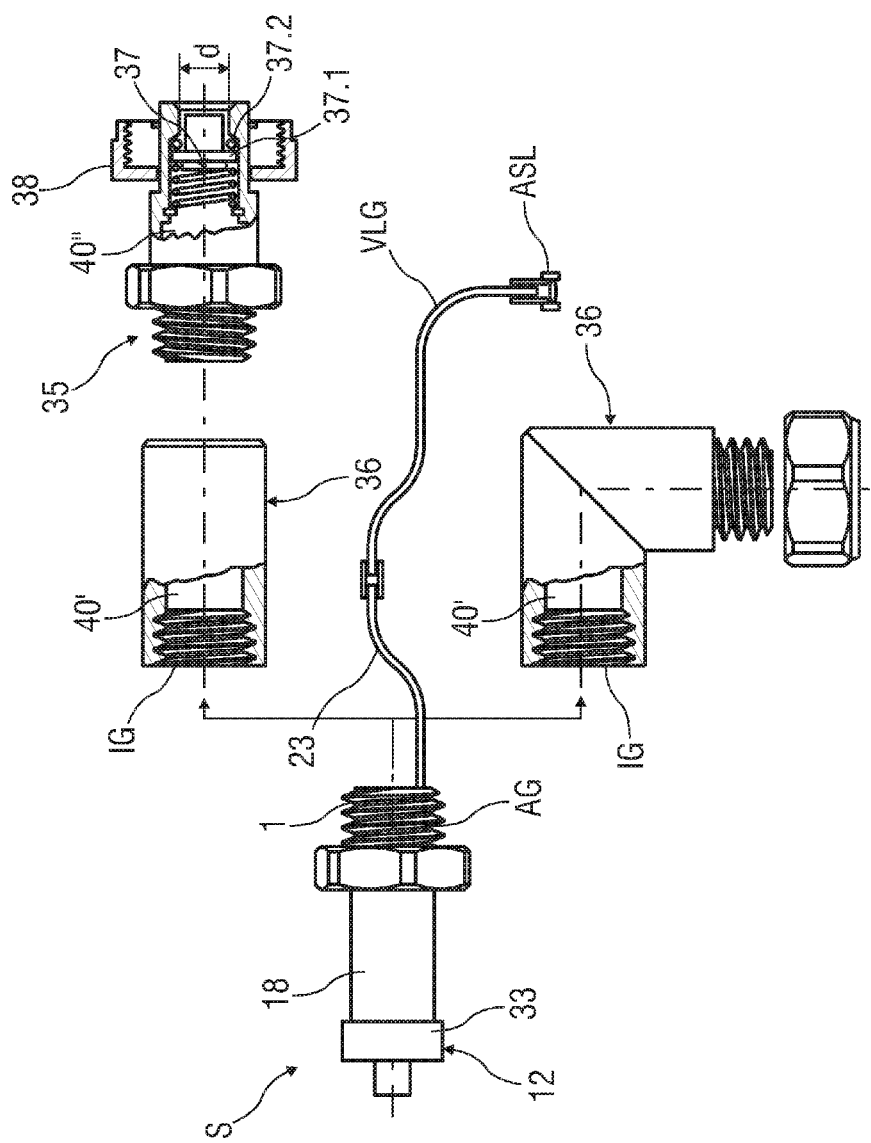
FIG. 2 is a schematic arrangement with a sensor system and a coupling piece.

FIG. 2 shows an arrangement with a sensor system S according to FIG. 1 and a coupling piece 35.

The coupling piece 35 is thereby provided to couple the sensor system S with the switchgear assembly and comprises a valve 37 which opens only after a fluid-tight connection of the coupling piece 35 with the switchgear assembly. The coupling piece 35, in particular, has a free connection diameter d of 15 mm to 25 mm, in particular, at least 20 mm.

In particular, the coupling piece 35 comprises a tube adapter which accommodates the valve 37 in itself. The valve 37 is formed from a spring-mounted valve plate 37.1 and a seal 37.2 designed as an O-ring. Only upon contact with an interior of the switchgear does the valve 37, and thus the coupling piece 35, open, thus connecting the sensor system S to a system atmosphere. The coupling is secured with a coupling nut 38 to the switchgear assembly.

In order to detect light flashes, the valve plate 37.1 is, in particular, transparent, e.g., made of glass or plastic, or optionally has an optical bundling function of light flashes to the sensor.

Alternatively, the light sensor system, in particular the light guide 21, may also be supplemented by an extension VLG or an attachment lens ASL, which are then fed into the application through the adapter parts 1G.

For a fluid-tight coupling of the sensor system S to the coupling piece 35, a sleeve 36 is provided which is formed straight or as an angled piece. In the case of using the angle piece, it is furthermore possible to place a glass fiber of the sensor therethrough, extending it so as to reach the interior of the switchgear assembly.

For this purpose, the sensor system S is screwed into an internal thread IG located on the sleeve 36 with an external thread AG located at the sensor connection 1.

The sleeve 36 is in turn fastened to the coupling piece 35.

Measurement signals generated by the sensor system S can be falsified in at least an initial period of assembly at the switchgear assembly due to a contact with ambient air. In order not to interfere with the detection of the sensor system S, an interior space 40 inside the sensor port 1, an interior space 40' located within the sleeve 36, and an interior space 40" surrounded by the coupling piece 35 are evacuated or filled with a protective gas such as dry gas, nitrogen or sulfur hexafluoride (SF6 for short). The evacuation or filling with gas takes place, in particular, via the coupling piece 35.

The sensor system S is thus kept in a dry, conditioned state and can immediately provide correct measurement data after assembly on the switchgear.

Likewise, it is possible that the sensor system S is closed without gas filling and without evacuation, since a lower humidity can occur in the interior spaces 40, 40', 40" than in the ambient air.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor system for determining physical variables of a switchgear assembly, the sensor system comprising:
a sensor connection, wherein within the sensor connection, a humidity sensor, a pressure sensor and a light sensor for detecting light flashes are arranged.

2. The sensor system according to claim 1, wherein the humidity sensor is positioned upstream of the pressure sensor and/or the light sensor is positioned upstream of the humidity sensor and the pressure sensor.

3. The sensor system according to claim 1, wherein the light sensor is coupled to at least one light guide for transmitting the light flashes from a point of origin to the light sensor.

4. The sensor system according to claim 3, further comprising an integrated self-testing device for one-off or cyclical device diagnostics, wherein the self-testing device, via an integrated light source, feeds light into the at least one light guide and tests a function of the light sensor via the coupled-in light.

5. The sensor system according to claim 3, wherein the at least one light guide is guided through a connecting region to the sensor connection via a glass feedthrough and/or the at least one light guide projects beyond the sensor connection.

6. The sensor system according to claim 1, wherein the humidity sensor has passage openings that bring a process pressure to the pressure sensor.

7. The sensor system according to claim 1, wherein the sensor connection is sealed with an adapter, a closure piece or a coupling piece, with a free connection diameter of 15 mm to 25 mm or at least 20 mm.

8. The sensor system according to claim 7, wherein an inner space surrounded by the coupling piece is evacuated or filled with a protective gas.

9. The sensor system according to claim 1, wherein a first temperature sensor is integrated into the humidity sensor, or the humidity sensor is coupled to the first temperature sensor; and a second temperature sensor is integrated into the pressure sensor, or the pressure sensor is coupled to the second temperature sensor.

10. The sensor system according to claim 9, wherein electrical signals are transmitted from the humidity sensor to a first evaluation board to determine a temperature-compensated humidity signal using a temperature detected via the first temperature sensor and electrical signals are transmitted from the pressure sensor to a second evaluation board to determine a temperature-compensated pressure signal using a temperature detected via the second temperature sensor, and wherein the second evaluation board is positioned between the first evaluation board and the pressure sensor.

11. The sensor system according to claim 9, wherein an evaluation board of the pressure sensor determines a temperature-compensated pressure signal using a temperature detected via the second temperature sensor, and transmits the temperature-compensated pressure signal via a connection system as a digital data signal and/or a density signal determined on the basis of the temperature and the pressure signal is transmittable via the connection system as a digital data signal.

12. The sensor system according to claim 9, wherein electrical contacts transmit electrical signals from the humidity sensor to an evaluation board, and wherein the electrical contacts are melted in glass and are arranged within the sensor connection.

13. The sensor system according to claim 12, wherein the evaluation board determines a temperature-compensated humidity signal from a temperature detected via the first temperature sensor, and transmits the temperature-compensated humidity signal via a connection system as a digital data signal.

14. The sensor system according to claim 13, wherein for the temperature-compensated humidity signal, at least one threshold value is stored, and wherein at least one signal generating unit is provided, which emits an additional signal upon reaching or exceeding the at least one threshold value.

15. A sensor system for determining physical variables of a switchgear assembly, the sensor system comprising:

a sensor connection, wherein within the sensor connection, a humidity sensor and/or a pressure sensor and a light sensor for detecting light flashes are arranged, wherein the light sensor is coupled to at least one light guide for transmitting the light flashes from a point of origin to the light sensor, and wherein the sensor connection comprises, on a process-facing side, a coupling device for adapting an external light source for performing a functional test.

16. A sensor system for determining physical variables of a switchgear assembly, the sensor system comprising:

a sensor connection, wherein within the sensor connection, a humidity sensor and/or a pressure sensor and a light sensor for detecting light flashes are arranged, wherein the light sensor is coupled to at least one light guide for transmitting the light flashes from a point of origin to the light sensor, and wherein an optical lens is arranged on a front end of the at least one light guide facing away from the sensor connection.

* * * * *